Sept. 3, 1940.   I. M. CLAUSEN   2,213,240
METER
Filed Nov. 10, 1937   3 Sheets-Sheet 1
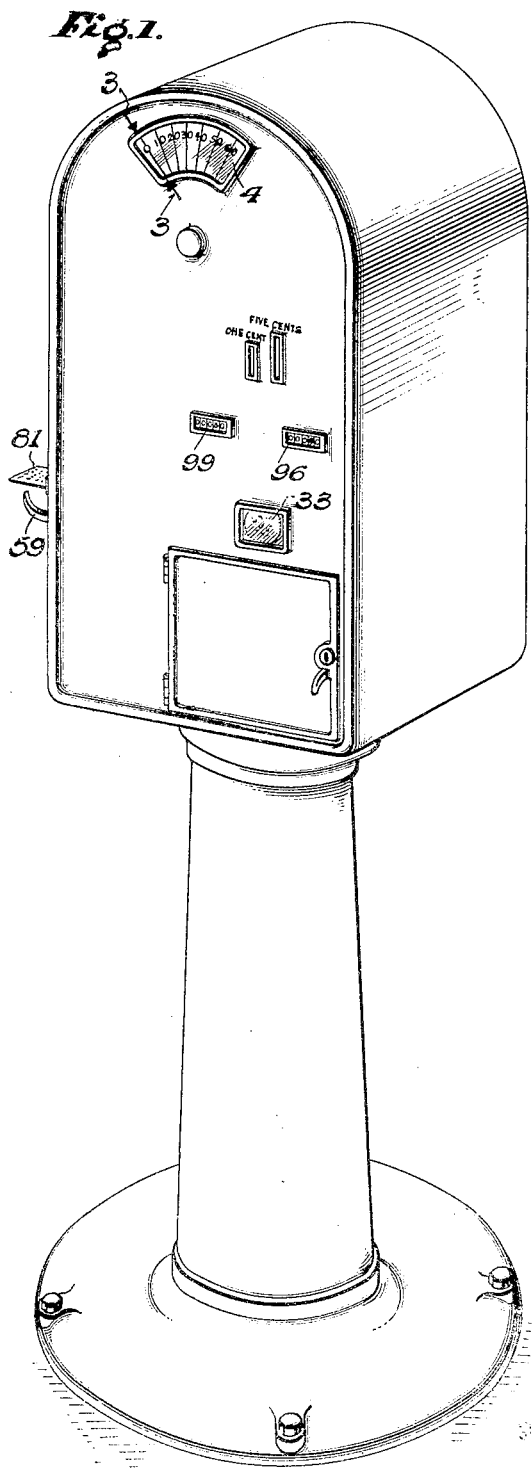
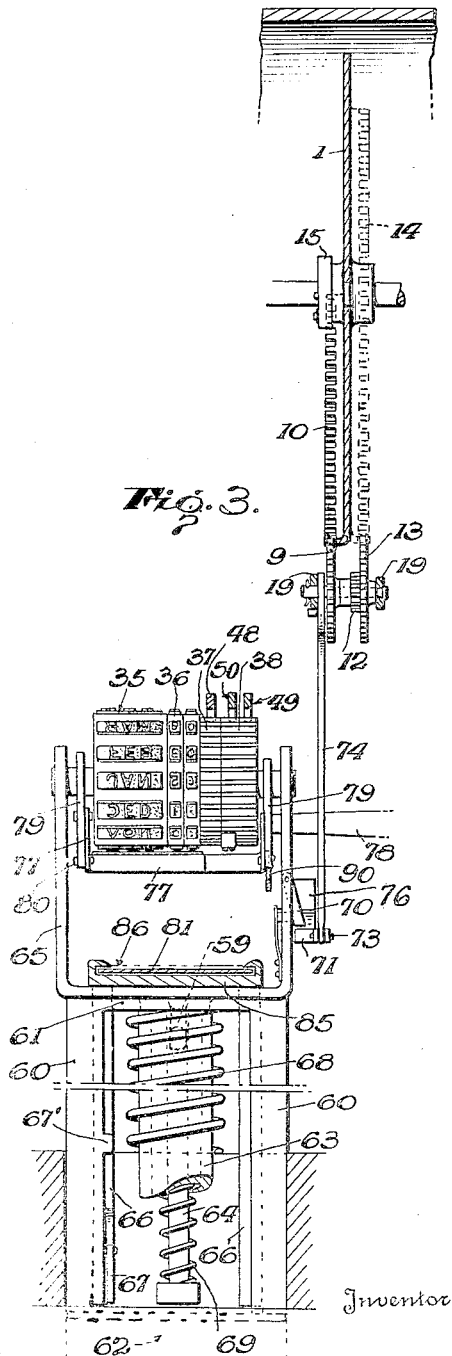
Inventor
Ingard M. Clausen
Cameron, Kerkam + Sutton
Attorneys

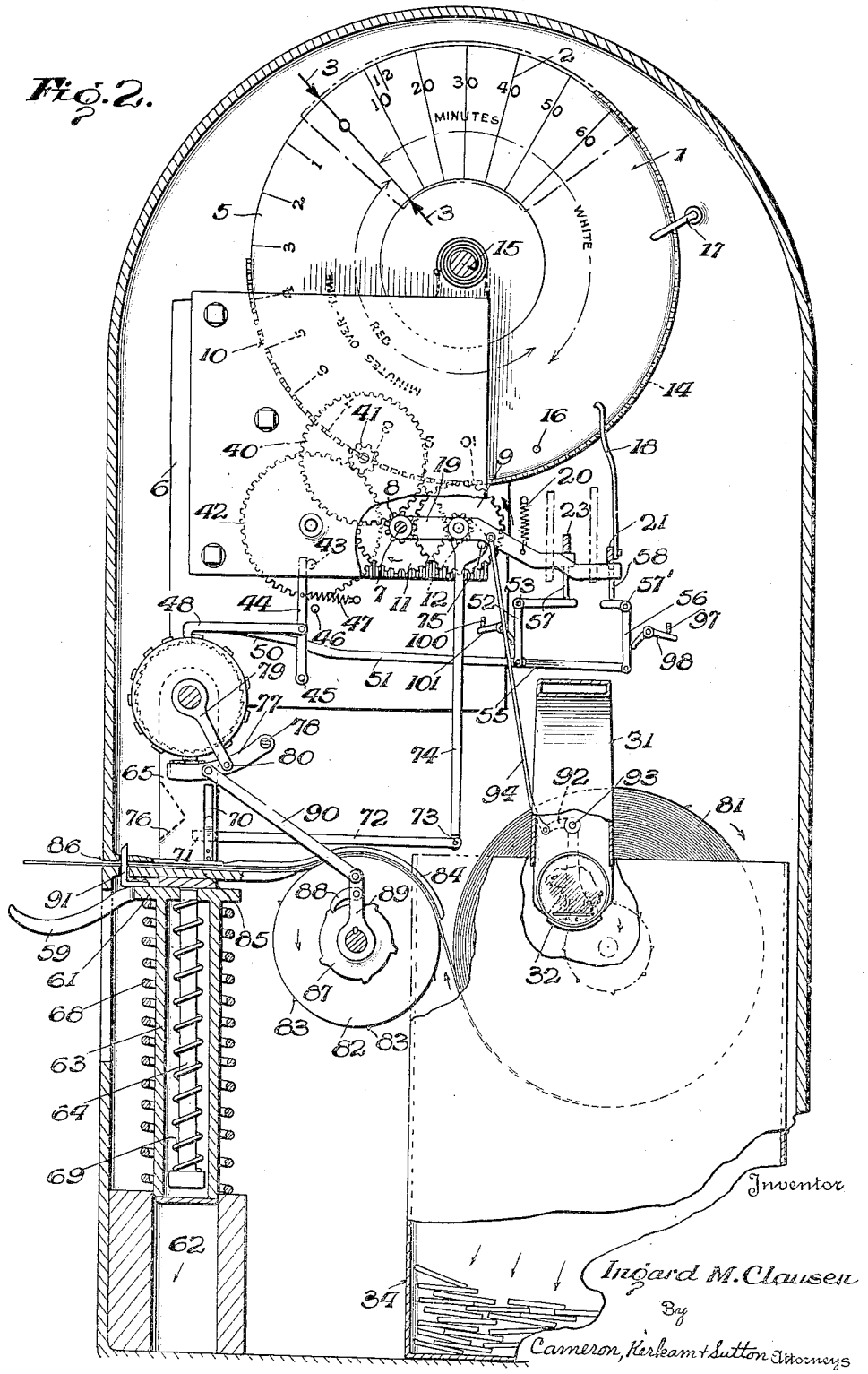

Sept. 3, 1940. I. M. CLAUSEN 2,213,240
METER
Filed Nov. 10, 1937 3 Sheets-Sheet 3
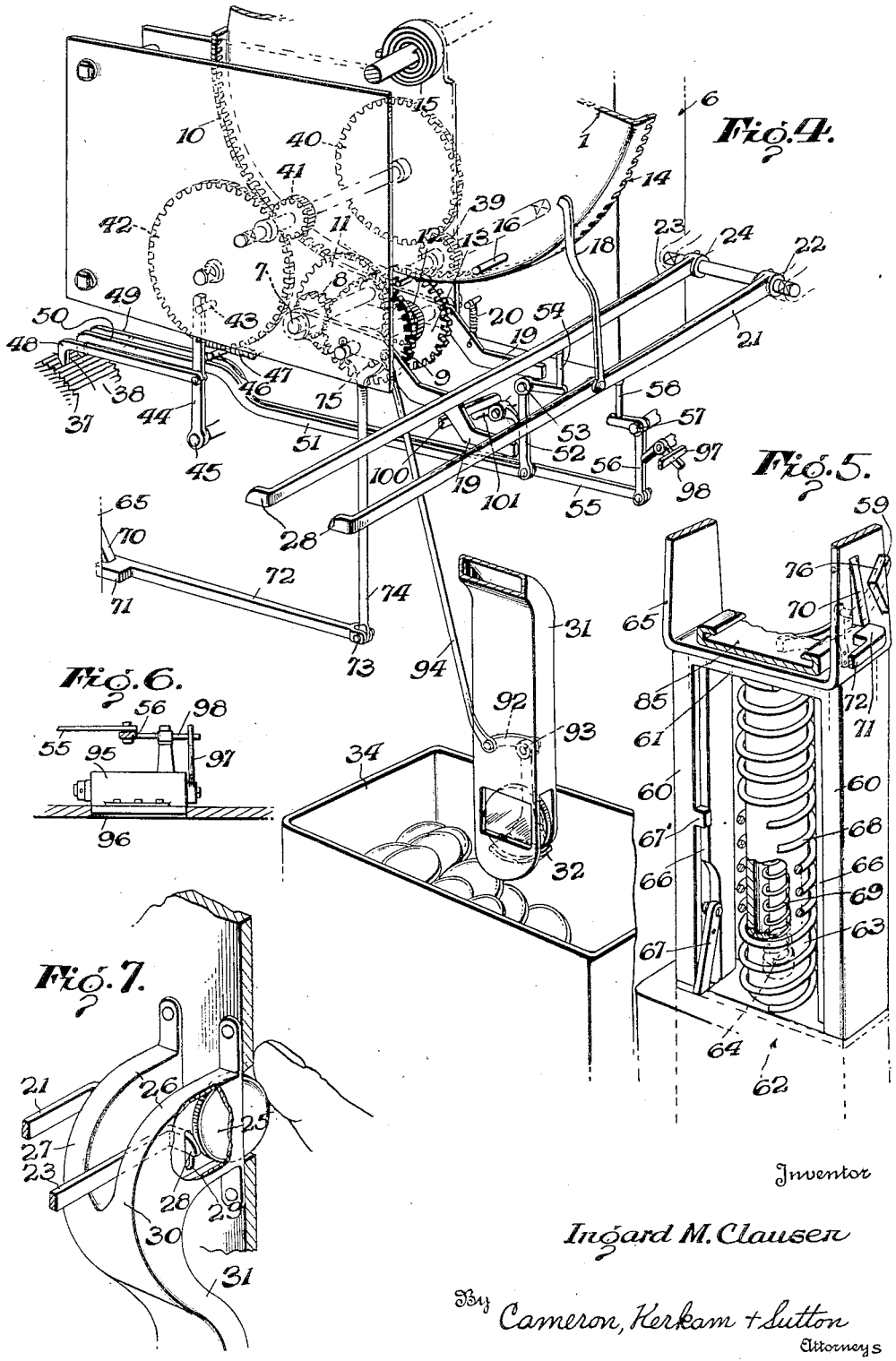
Inventor
Ingard M. Clausen
By Cameron, Kerkam + Sutton
Attorneys Patented Sept. 3, 1940

2,213,240

UNITED STATES PATENT OFFICE 2,213,240

METER

Ingard M. Clausen, Phoenix, Ariz.

Application November 10, 1937, Serial No. 173,940

11 Claims. (Cl. 194—1)

This invention relates to meters of the type embodying a clock mechanism actuated by the insertion of a coin to operate a suitable signal to indicate a predetermined period of time. The invention is particularly adapted for use in parking meters such as are mounted along street curbs or in parking areas, and is hereinafter illustrated and described in connection with such a device, although it will be understood that features of the invention may be used in meters of other types.

It is an object of the invention to provide a novel coin-actuated meter which not only operates a signal to indicate a predetermined time period, but also prints and issues a ticket for each coin insertion.

Another object is to provide a novel parking meter embodying a signal and printing mechanism which is automatically set to print a receipt ticket with the proper date.

A further object is to provide a novel parking meter having a continuously operating clock mechanism which operates a signal for a predetermined period on insertion of a coin and also automatically regulates a printing mechanism to set it for the proper date.

Another object is to provide a novel parking meter embodying a signal and a device for printing a ticket which are operable only on insertion of a coin, together with means for preventing the operation of said printing device more than once for each coin inserted.

A further object is to provide a novel parking meter embodying a coin-actuated clock mechanism and a signal device which cooperate to automatically select and indicate different parking periods depending on the value of the coin inserted.

A still further object is to provide a novel parking meter having an indicating dial which is movable by clock mechanism to indicate a predetermined parking period and is released from the clock mechanism and positively returned to starting position automatically on insertion of a coin.

Another object is to provide a novel parking meter having a movable dial with portions of different colors, one portion being visible during a paid parking period and the other at all other times.

Other objects of the invention will appear more fully hereinafter as the description proceeds.

One embodiment of the invention has been illustrated in the accompanying drawings but it is to be expressly understood that said drawings are for purposes of illustration only and are not to be taken as a definition of the limits of the invention, reference being had to the appended claims for this purpose.

In the drawings:

Fig. 1 is a perspective view of one form of parking meter embodying the invention;

Fig. 2 is an elevation of the meter shown in Fig. 1 with the face plate removed to show the internal mechanism;

Fig. 3 is a detail view of a part of the mechanism of Fig. 2;

Fig. 4 is a perspective view illustrating a part of the gearing together with coin-actuated mechanism associated therewith;

Fig. 5 is a detail view illustrating a suitable construction of the printing mechanism;

Fig. 6 is a detail view illustrating a suitable coin counter; and

Fig. 7 is a detail view showing a suitable coin slot for insertion of a coin in the device.

Generally stated, a meter embodying the invention comprises any suitable clock mechanism preferably adapted for continuous operation over a period of several days, such as an eight-day clock, in order to reduce the amount of service required. Associated with and controlled by this clock mechanism is a printing mechanism for stamping a ticket with the proper date, the printing mechanism being set automatically by the clock mechanism to the proper date. Associated with the clock mechanism is also a suitable indicating device, such as a graduated dial for example, which is arranged to be actuated by the clock on the insertion of a coin to indicate a predetermined period. To these ends mechanism actuated by insertion of a coin is provided to start the rotation of the dial and also to render the printing mechanism operable for printing only one ticket for each coin inserted in the meter. Preferably but not necessarily the device is further adapted for the insertion of coins of different values and to select automatically a parking period corresponding to the value of the coin inserted in the device.

It will be understood that from the broad aspects of the invention, these associated mechanisms may be of any suitable type known to the art, and it is to be understood that while the specific mechanisms illustrated in the drawings and described in detail hereinafter represent the preferred embodiment at the present time, they may be substituted by equivalent mechanisms that are adapted for cooperation in the manner described above within the broad limits of the invention as defined in the appended claims.

In the form shown, the signal or indicating device comprises a rotatable dial 1 having a graduated scale 2 which indicates any suitable parking period for which the device is designed to operate. As here shown, the parking period has been assumed, for example, to be sixty minutes and the scale 2 is graduated from zero to sixty in units of ten minutes. The dial may be operated to indicate either the portion of the sixty-minute period that has expired or the portion that remains. As herein shown, the index marks 3 indicate the remaining portion of the period, and in the position of the dial shown in Fig. 2, a sixty-minute parking period has expired, the index marks 3 pointing to zero on the scale 2 showing that there is no further portion of the sixty-minute period remaining. On insertion of another coin in the machine, the dial 1 is returned by means hereinafter described in a counter-clockwise direction to bring the graduation on the scale marked "60" opposite the index marks 3 for the start of a further parking period. In the event a coin of smaller value is inserted, the dial is returned only a part of this distance, for example, until the graduation marked "12" is opposite the index marks 3, in which case the parking period is limited to twelve minutes. This graduated portion of the dial is visible through the casing of the instrument by means of a suitable window 4 as shown in Fig. 1, the extent of which is preferably just sufficient to expose the entire scale 2 as indicated by the dotted lines in Fig. 2.

The dial may also be provided with an additional graduated scale 5 for the purpose of indicating overtime parking, this scale in the form shown being graduated from one to ten to indicate up to ten minutes of overtime parking according to which graduation appears opposite the index marks 3. It is also desirable to use different colors for the parking period and for overtime parking, white being indicated on Fig. 2 for the parking period and red for the overtime parking period for purposes of example. In order that the window 4 may show all red within the desired overtime period, the overtime scale is expanded throughout a greater angular extent on the dial as compared with the scale 2 and means are provided whereby the speed of the dial is increased after the parking period has expired.

The dial 1 is driven by any suitable clock mechanism which is indicated diagrammatically at 6 in Fig. 2, but preferably by a clock which operates over a period of several days in order to reduce the amount of service required for the meter. Since this clock mechanism operates continuously as indicated above, it must be rewound at periodic intervals and preferably is adapted to run for eight days. The power take-off shaft of the clock mechanism is indicated at 7 and this shaft carries a small pinion 8 meshing with and driving a gear 9 which in turn meshes with a rack 10 formed on a flange extending to one side of the periphery of the dial 1 throughout a portion of the periphery equal to or slightly greater than the angular extent of the parking time scale 2. As shown in Fig. 2, the gear 9 has rotated the rack 10 and dial 1 in a clockwise direction throughout the entire parking period of sixty minutes and has just reached the end of the rack 10.

In order to provide for operation of the dial at greater speed throughout the overtime parking period, where this is desirable, the take-off shaft 7 also carries a gear 11 meshing with a pinion 12 integral with a gear 13 that is coaxial with and of substantially the same size as the gear 9. At the instant that the gear 9 runs off the end of the rack 10, the faster gear 13 enters into mesh with a rack 14 formed on a flange on the periphery of the dial 1 on the side opposite the rack 10. The rack 14 extends around the periphery of the dial through a distance equal to or slightly greater than the overtime parking scale 5, so that the dial continues to rotate in a clockwise direction from the position shown in Fig. 2, but at a greater rate of speed, until the graduation marked 10 of the overtime scale reaches the index marks 3. This places the red overtime sector of the dial in front of the window 4.

When the gear 13 reaches the end of the rack 14, rotation of the dial stops and the dial remains in that position until another coin is inserted. On the insertion of another coin, however, gears 9 and 13 are moved away from the periphery of the dial as hereinafter described and the dial is automatically returned to the desired starting position, preferably by means of a spiral spring 15 surrounding the shaft of the dial and arranged to be wound up while the dial is being driven by the gears 9 and 13. Return movement of the dial may be limited in any suitable way to obtain the desired starting position of the dial. As shown, a pin 16 on the dial is adapted to engage a stop 17 that is fixed to the casing of the device at the instant when the graduation "60" of the scale 2 reaches the index marks 3. When it is desired to provide for a smaller parking period for a coin of less value, an additional stop 18 may be employed to stop the dial in such a position that the graduation marked "12" of the scale 2 is opposite the index marks 3, the stop 18 being suitably arranged to be removed from the path of the pin 16 when a coin of larger value is inserted.

The driving gears 9 and 13 are moved away from the dial by suitable means actuated by the insertion of a coin in the meter. In the form shown, the driving gears 9 and 13 are mounted on a shaft that is supported between a pair of arms 19 capable of swinging as a unit about the take-off shaft 7. The gears 9 and 13 are normally maintained in the position shown in Fig. 2 by any suitable means such as a spring 20 interposed between one of the arms 19 and the casing of the machine. As shown in Fig. 4, the arms 19 may suitably be depressed on insertion of a coin by a lever 21 pivoted at one end at 22 and having its free end extending adjacent to the coin slot to be engaged by a coin on insertion into the device as hereinafter described. The lever 21 passes over one of the arms 19 and its movement is sufficient to depress the arm 19 by an amount sufficient to move the gears 9 and 13 away from the dial 1 and release the dial for return to starting position as above described.

Where, as in the form shown, the machine is adapted to receive coins of different values, the lever 21 may be assumed to be associated with the coin slot of higher value and hence the stop 18 is adapted to be actuated by depression of the lever 21, as by mounting the stop on the lever (Fig. 4). Hence insertion of a coin of higher value not only releases the dial but also removes the stop 18 from the path of the pin 16 and permits the dial to rotate counterclockwise until the pin 16 engages the stop 17. For coins of lesser value, a second lever 23 passes over one or more of the arms 19, said lever 23 having one end suitably pivoted at 24 and having its free end associated with a second coin slot. Hence on insertion of a coin of lesser value, arms 19 are depressed, gears 9 and 13 are moved away from the dial to permit its counterclockwise rotation by the spring 15, but the stop 18 remains in the position shown in Fig. 2 and limits the rotation of the dial by engagement of the pin 16 therewith.

Any suitable means may be employed for insertion of the coins into the machine for operation of the levers 21 or 23 and for collection of said coins in a suitable receptacle. One suitable arrangement is illustrated by Fig. 7 wherein a coin 25 is shown partially inserted in a slot in the casing of the device. Within the casing the coin 25 is guided downwardly by a curved guide wall 26 into a coin chute 27. The lever 21 has its free end bent over at 28 and extending through a small slot 29 in the side wall of the coin guide. Hence in order to insert a coin in the device, it is necessary to force the inwardly projecting end 28 of the lever 21 downwardly against the bottom of the slot 29, the coin then slipping over the end of the lever and passing into the chute 27. It will be understood that a similar arrangement is employed for the lever 23 whereby a coin passes into a second coin chute 30. Preferably the chutes 27 and 30 are combined into a single chute 31 through which the coin drops against a suitable stop 32 which supports it in front of a window 33 in the casing of the meter so that the coin is visible from the outside. The coin remains in this position until the next coin is inserted in the machine, whereupon the stop 32 is moved to one side as hereinafter described to permit the first coin to drop into a receiver 34, the stop 32 immediately returning to the position shown in Fig. 2 to catch and hold said next coin.

As indicated above, the meter is also adapted to print a dated ticket which is issued to the user of the device and to this end embodies a suitable printing mechanism preferably controlled by the clock 6 to set the proper date. As shown in Fig. 3, the printing device comprises a rotatable drum 35 for printing the months of the year, which is preferably set by hand at the end of each month. Adjacent the drum 35 is a rotatable drum 36 for printing the dates within the month, said drum being secured in any suitable manner to an operating disk 37 provided with teeth corresponding in number to the days of the month. Where, as in the form shown, the device is designed for operation with coins of different value, said printing mechanism is preferably adapted also to print the value of the coin inserted in the machine and accordingly is provided with a further drum 38 which is adapted to print the value of the coin. In the form shown coins of two values can be employed and hence the drum 38 has two positions, being automatically shifted from one to the other depending on the value of the coin inserted.

For setting the drum 36, the take-off shaft 7 of the clock mechanism is provided with a small pinion 39 meshing with a gear 40, and a small pinion 41 secured to the gear 40 meshes with and drives a gear 42. A pin 43 on the gear 42 engages the free end of a lever 44 which is pivoted as at 45 and is normally maintained against a fixed stop 46 by a spring 47. Motion of the lever 44 when engaged by the pin 43 moves a pawl 48 on the pawl disk 37 to the left (Fig. 2) through one tooth of the disk, and when the pin 43 has passed by the lever 44, the spring 47 pulls the lever back against the stop 46 and thereby rotates the pawl disk 37 one tooth and shifts the drum 36 to bring the next date into printing position. It will be understood that the gearing is such as to cause pin 43 to engage lever 44 once each twenty-four hours of operation of the clock 6 at approximately midnight.

Similarly, the drum 38 is shifted to one or the other of its printing positions by mechanism actuated by the insertion of coins into the device. As here shown, two pawls 49 and 50 bear on the teeth at the top of the drum 38. Pawl 50 is carried by a rod 51 that is pivoted to one arm of a bell crank lever 52 pivoted on the casing at 53. The other arm of said bell crank lever is arranged to be depressed by a finger 54 projecting downwardly from the lever 23 when a coin is inserted in the proper slot. The other pawl 49 is carried by a rod 55 that is pivoted to one arm of a bell crank lever 56 mounted at 57 on the casing. The other arm of the bell crank 56 is arranged to be depressed by a finger 58 extending downwardly from the lever 21 when a coin is inserted in the proper slot. From the arrangement of the bell crank levers 52 and 56 as shown in Fig. 2, it will be seen that depressing the lever 21 shifts the pawl 49 to the right and rotates the drum 38 in a clockwise direction whereas depression of the lever 23 shifts the pawl 50 to the left and rotates the drum 38 in a counterclockwise direction.

The printing mechanism may be of any suitable type and operated in any suitable manner. As here shown, said mechanism is locked against operation until a coin is inserted in the device whereupon it is released for actuation manually by means of the finger piece 59 which extends through a slot in the casing. This finger piece is secured to a frame shown in greater detail in Fig. 5 and comprising two legs 60 connected by a cross piece 61 and slidable in a recess 62 formed in the casing as shown in Fig. 2. Centrally disposed on the cross piece 61 is a cylinder 63 within which is a rod 64 connected to the U-shaped frame 65 which carries the printing drums 35, 36 and 38 as above described. Said frame 65 is also provided with slides 66 which operate in grooves formed in the legs 60 of the outer frame, and one of said slides 66 carries a spring pressed pawl 67 which normally rests against a stationary part of the casing.

When the finger piece 59 is depressed, the outer frame moves downwardly, compressing a coil spring 68 which surrounds the cylinder 63 and also compressing a coil spring 69 which surrounds the rod 64 within the cylinder and which tends to force the frame 65 downwardly. However, frame 65 is held against downward movement by pawl 67' until a projection 67' on the outer frame rides over the pawl pushing it inwardly and releasing the frame 65 so that the compressed spring 69 operates to pull the printing device suddenly down into contact with a ticket to be printed.

Suitable means are provided to prevent the printing frame from being actuated without depositing a coin. As shown, said frame 65 is normally held against downward movement by means of a spring pressed pawl 70 which engages a projection 71 on the end of an arm 72 which is pivoted at 73 to the lower end of an arm 74 carried by the shaft of the driving gears 9 and 13. As shown in Fig. 2, the upper end of the arm 74 extends laterally and is provided with a pin 75 extending below one of the arms 19. When said arms are depressed on insertion of a coin, the pivot 73 at the lower end of the arm 74 is moved downwardly and to the left as seen in Fig. 2, moving the projection 71 clear of the pawl 70 and releasing the frame 65 for downward movement when the finger piece 59 is operated as described above. When the arms 19 are returned to normal position by the spring 20, however, the pivot 73 is lifted but is not immediately swung to the right. When the printing frame is depressed by the finger piece 59 a cam surface 76 on the frame 65 engages the end of the arm 72 and moves it back to the right as shown in Fig. 2. As the printing frame returns upwardly, the pawl 70 is forced inwardly against its spring and rides over projection 71 and thereafter is snapped out by the spring into the position shown in Fig. 3 to lock the printing frame against further depression until another coin is inserted into the machine. In this way it is insured that only one ticket can be printed for one coin inserted in the machine.

In case the user of the meter should not operate the printing mechanism to obtain a ticket, the arm 72 and projection 71 will be moved to the right to normal position by the rotation of the driving gear 9, there being sufficient friction between this gear and the upper end of the arm 74 to swing the latter to the right as the gear rotates. Hence after a short interval the printing mechanism is locked against operation even though it is not operated by the user.

Suitable inking mechanism may be provided for the printing drums. As here shown, an ink pad 77 is pivoted to the frame at 78 and normally extends under the printing drums in contact with the type thereon. A pair of arms 79 are mounted on the shaft which carries the printing drums and are pivotally connected to the ink pad at 80, so that when the printing frame is depressed, the ink pad is swung out of the way, said pad being returned to normal position by the upward movement of the printing frame.

Any suitable mechanism may be employed for storing and feeding tickets to the printing mechanism and for issuing printed tickets to the user of the meter. As shown, a roll of undated tickets 81 is rotatably mounted in the frame, the strip of tickets passing over a feeding drum 82 provided with feeding teeth 83 and cooperating with a guard 84 to feed the ticket strip over a printing table 85 and thence through a slot 86 in the casing. The feeding drum 82 is arranged for step by step rotation by an amount equal to the width of one ticket by any suitable means, being here shown provided with a pawl disk 87 engaged by a pawl 88 that is pivoted on an arm 89 secured to the shaft of the drum. The end of the arm 89 is pivotally connected to the ink pad 77 by a link 90. Hence as the printing frame is depressed and the ink pad swings to the dotted line position shown in Fig. 2, the link 90 swings the arm 89 in a clockwise direction and pawl 88 is thereby engaged with the next succeeding tooth on the pawl disk 87. After the ticket has been printed and the printing frame returns upwardly, the ink pad swings back to normal position and the link 90 pulls the arm 89 and pawl 88 in a counterclockwise direction, thereby rotating the feeding drum 82 and advancing the ticket strip by the width of one ticket. This movement issues the printed ticket through the slot 86 and the printed ticket is severed from the strip by a suitable knife 91 secured to the outer frame 61. The knife 91 also acts as a weatherguard and closes the slot 86.

Depression of arms 19 by insertion of a coin may also be employed to operate the stop 32 which supports a coin before the window 33. To this end the stop 32 is carried at the end of a bell crank 92 pivoted at 93 on the frame, the other end of the bell crank being connected to the arms 19 by a rod 94. Hence as a coin is inserted in either of the coin slots, rod 94 swings the bell crank lever 92 and moves the stop 32 to release the coin previously deposited in the machine, said stop immediately swinging back to normal position as the arms 19 move upwardly and thereby catching the next coin and holding it before the window 33.

If desired, suitable coin counting devices may also be actuated by depression of the arms 19. Where coins of different value are to be used, a counter for each coin is employed and in this case the counters are preferably operated by the bell cranks 52 and 56. One of these counters is shown in Fig. 6, the casing 95 of the counter being mounted before a window 96 in the casing of the meter and the counter operating arm 97 being arranged to be actuated by a bell crank 98 pivoted on the frame of the device with its other arm engaging the bell crank 56. Hence said counter is operated once for each depression of the lever 21. The other counter is mounted before a similar window 99 in the casing of the meter and is actuated from the bell crank 52 in a similar manner, Fig. 2 showing the actuating arm 100 of this counter and the bell crank 101, one arm of which engages said actuating arm 100 and the other arm of which engages the bell crank 52.

The operation of the device may be briefly summarized as follows: Assume the two coin slots to be intended for pennies and nickels as indicated on Fig. 1, and that the meter is in the condition described above resulting from the next preceding use thereof. The user then inserts a coin in the proper slot, thereby releasing the dial which then automatically returns to starting position, selecting the proper parking period depending upon the value of the coin inserted. At the same time the printing mechanism is released for actuation as above described whereby operation of the finger piece 59 results in issuing to the user a ticket printed with the proper date and also with the amount corresponding to the value of the coin inserted in the machine. Insertion of the coin also trips the stop 32 so that the preceding coin is deposited in the receiver 34. At the same time one or the other of the coin counters is operated depending upon which slot is used.

The coin passes into the coin chute and the driving gears 9 and 13 move back to operative position to drive the dial 1 while at the same time the stop 32 moves into position to catch and hold the descending coin before the window 33. The dial then begins to rotate at slow speed, being driven by the gear 9. At this time the sector of the dial showing through the window 4 is white. The dial continues to rotate until the parking period has expired and the index marks 3 indicate zero on the scale 2. At this time the faster driving gear 13 comes into action to drive the dial 1 at a faster rate through the overtime parking period, the white sector of the dial gradually disappearing from the window 4 and being replaced by the red sector of the dial. At the end of the overtime parking period the dial stops at which time the window 4 shows only the red sector of the dial. The meter then remains in this condition until another coin is inserted.

The display of a red sector of the dial in the window 4 after the parking period has expired enables the meter to be readily inspected, for example, from a motorcycle or automobile passing along the street. The arrangement of the dial with its white and red sectors simplifies the construction of the device and reduces the number of parts while at the same time it accomplishes the results heretofore attained from the use of separate signals of different colors which are alternately movable into a visible position.

The printed and dated ticket issued by the meter on operation of the finger piece 59 not only provides a receipt for the user of the meter but makes it possible to correlate the parking meter system with merchandising systems. For example, arrangements may be made for the redemption of these parking tickets by merchants in the event a person presenting the ticket makes a purchase of a suitable amount. The meter facilitates such correlation by preventing the issuance of more than one ticket for each coin inserted in the machine and also by recording the date and the amount for which the ticket is issued. On the other hand, if the user does not wish a ticket and does not operate the printing mechanism, then the meter automatically locks the printing mechanism after a short interval so that unauthorized operation thereof by another is prevented. At the same time these results are accomplished with a simple but reliable mechanism which requires no more service or attention than is normally involved in the periodic collection of coins from meters of this general type.

The arrangement of the dial rotatable in one direction to indicate parking time but released on insertion of a coin for automatic rotation in the opposite direction to its starting position facilitates selectivity for coins of different values, as it is only necessary to control the extent of such opposite rotation according to the value of the coin inserted. Furthermore the provision of different rates of rotation of the dial during parking and overtime parking results in flexibility of use of the meter under different conditions. As shown, the ratio of speeds is 10 to 1, so that although the maximum parking period of sixty minutes is visible through the window 4, yet at the same time the window becomes completely red within six minutes overtime due to the more rapid rotation, so that an easily visible signal is provided for an inspecting officer. This speed ratio can be varied as desired. Further, the overtime parking sector can be graduated on a smaller scale for any larger period, say one hour, with the speed ratio reduced to say two to one. In this case overtime parking is accurately indicated over a long period, as a basis for a possible graduated fine system, while at the same time a completely red signal is exhibited in the window in a lesser period which can be reduced further, if desired, by decreasing the size of the window 4.

While only one embodiment of the invention has been described and illustrated in the drawings, it will be understood that the invention is capable of a wide variety of mechanical embodiments, many of which will now occur to those skilled in the art. For example, various equivalent mechanisms may be substituted for those specifically illustrated and changes may be made in the form, details of construction and arrangement of the parts without departing from the spirit of the invention. Also certain features of the invention can be advantageously utilized without other features thereof; for example, it may not be desirable in all cases to provide for operation by coins of different values and in such a case those parts of the mechanism described above which are made necessary by the provision for operation by different coins may be omitted. Such changes will readily be apparent to those skilled in the art and reference should therefore be made to the appended claims for a definition of the limits of the invention.

What is claimed is:

1. A coin-controlled parking meter comprising clock mechanism, means for indicating a parking period comprising a time-indicating device resettable to a starting position to indicate the beginning of a parking period, means for printing and issuing a ticket from said meter comprising a time-controlled printing device, driving connections between said clock mechanism and said time-indicating device and between said clock mechanism and said time-controlled printing device, and coin-controlled means for resetting and operating said indicating means and for operating said printing and issuing means, said coin-controlled means comprising a coin-actuated control device whereby insertion of a coin renders said meter operable to indicate said parking period and to print and issue said ticket.

2. A coin-controlled parking meter comprising clock mechanism, means for indicating parking periods of different lengths corresponding to the value of a coin inserted in the meter and comprising a time-indicating device resettable to a starting position to indicate the beginning of a parking period, means for printing and issuing a ticket from said meter comprising a time-controlled printing device and a value-printing device settable according to the value of the coin inserted, driving connections between said clock mechanism and said time-indicating device and between said clock mechanism and said time-controlled printing device, and coin-controlled means for resetting and operating said indicating means and for setting said value-printing device and for operating said printing and issuing means, said coin-controlled means comprising a coin-actuated control device whereby insertion of a coin sets said value-printing device according to the value of the coin and renders said meter operable to indicate the corresponding parking period and to print and issue said ticket.

3. A coin-controlled parking meter comprising clock mechanism, means for indicating a parking period comprising a time-indicating device resettable to a starting position to indicate the beginning of a parking period, means for printing and issuing a ticket from said meter comprising a time-controlled printing device, driving connections between said clock mechanism and said time-indicating device and between said clock mechanism and said time-controlled printing device, and coin-controlled means for resetting and operating said indicating means and for operating said printing and issuing means, said coin-controlled means comprising a coin-actuated control device whereby insertion of a coin renders said meter operable to indicate said parking period and to print and issue said ticket and also comprising locking means for preventing operation of said printing and issuing means more than once for each coin inserted in the meter.

4. A coin-controlled parking meter comprising clock mechanism, means for indicating a parking period comprising a time-indicating device resettable to a starting position to indicate the beginning of a parking period, manually operable means for printing and issuing a ticket from said meter comprising a time-controlled printing device, driving connections between said clock mechanism and said time-indicating device and between said clock mechanism and said time-controlled printing device, means normally locking said printing and issuing means against manual operation, and a common coin-control mechanism for initiating the operation of said indicating means and for releasing said locking means on insertion of a coin in said meter.

5. A coin-controlled parking meter comprising clock mechanism, means for indicating a parking period comprising a time-indicating device resettable to a starting position to indicate the beginning of a parking period, manually operable means for printing and issuing a ticket from said meter comprising a time-controlled printing device, driving connections between said clock mechanism and said time-indicating device and between said clock mechanism and said time-controlled device, means normally locking said printing and issuing means against manual operation, a common coin-control mechanism for initiating the operating of said indicating means and for releasing said locking means on insertion of a coin in said meter, and means actuated by operation of said printing and issuing means for resetting said locking means.

6. A coin-controlled parking meter comprising clock mechanism, means for indicating a parking period comprising a time-indicating device resettable to a starting position to indicate the beginning of a parking period, manually operable means for printing and issuing a ticket from said meter comprising a time-controlled printing device, driving connections between said clock mechanism and said time-indicating device and between said clock mechanism and said time-controlled printing device, means normally locking said printing and issuing means against manual operation, a common coin-controlled mechanism for initiating the operation of said indicating means and for releasing said locking means on insertion of a coin in said meter, means actuated by operation of said printing and issuing means for resetting said locking means, and means actuated by said clock mechanism for resetting said locking means in the absence of manual operation of said printing and issuing means.

7. A coin-controlled parking meter comprising clock mechanism, a rotatable dial for indicating a parking period, manually operable means for printing and issuing a ticket from said meter comprising a time-controlled printing device, driving connections between said clock mechanism and said dial and between said clock mechanism and said printing device, coin-controlled means for disconnecting the driving connections to said dial on insertion of coin, means operable on such disconnection for returning said dial to a starting position to indicate the beginning of a starting period, coin-controlled means for releasing said printing and issuing means for manual operation, and a coin-actuated control mechanism common to both said coin-controlled means.

8. A coin-controlled parking meter comprising clock mechanism, a rotatable dial for indicating a parking period, connections between said clock mechanism and dial for driving the dial in its indicating direction, coin-controlled means for disconnecting said connections on insertion of a coin, means operable on such disconnection for rotating the dial in the opposite direction to a starting position to indicate the beginning of a parking period, selective coin-controlled means to stop the return rotation of the dial in one of a plurality of starting positions corresponding to the value of the coin, manually operable means for printing and issuing a ticket from said meter comprising a time-controlled printing device, driving connections between said clock mechanism and said printing device, coin-controlled means for releasing said printing and issuing means for manual operation, and a coin-actuated control mechanism common to said three coin-controlled means.

9. A coin-controlled parking meter comprising clock mechanism, a rotatable dial for indicating a parking period, said dial having a graduated sector for a desired parking period and a graduated sector for an overtime parking period, driving connections between said clock mechanism and said dial for driving the dial in its indicating direction and constructed and arranged to rotate said dial at different speeds during said different periods, coin-controlled means for disconnecting said driving connections on insertion of a coin, means operable on such disconnection for rotating said dial in the opposite direction to a starting position to indicate the beginning of a parking period, manually operable means for printing and issuing a ticket from said meter comprising a time-controlled printing device, driving connections between said clock mechanism and said printing device, coin-controlled means for releasing said printing and issuing means for manual operation, and coin-actuated control mechanism common to both said coin-controlled means.

10. A coin-controlled parking meter comprising clock mechanism, a rotatable dial for indicating a parking period, connections between said clock mechanism and said dial for driving the dial in its indicating direction, coin-controlled means for disconnecting said connections on insertion of a coin, means operable on such disconnection for rotating the dial in the opposite direction to a starting position to indicate the beginning of a parking period, selective coin-controlled means to stop the return rotation of the dial in one of a plurality of starting positions corresponding to the value of the coin, and a coin-actuated control mechanism common to both said coin-controlled means.

11. A coin-controlled parking meter comprising clock mechanism, a rotatable dial for indicating a parking period, said dial having a graduated sector for a desired parking period and a graduated sector for an overtime parking period, driving connections between said clock mechanism and said dial for driving the dial in its indicating direction and constructed and arranged to rotate said dial at different speeds during said different periods, coin-controlled means for disconnecting said driving connections on insertion of a coin, and means operable on such disconnection for rotating the dial in the opposite direction to a starting position to indicate the beginning of a parking period.

INGARD M. CLAUSEN.